S. C. SHERMAN.
BEVERAGE MIXER.
APPLICATION FILED OCT. 14, 1919.
1,345,263.
Patented June 29, 1920.
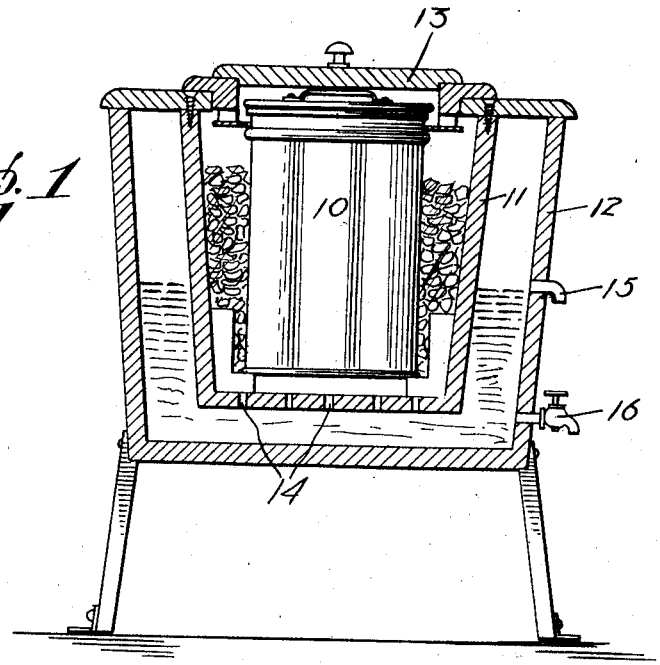
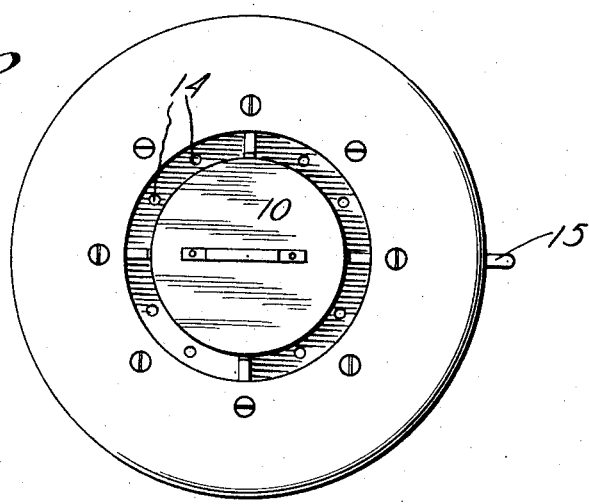
Witnesses
H. B. Rickman
Inventor
S. C. Sherman
By Victor J. Evans
Attorney

UNITED STATES PATENT OFFICE.

SAMUEL CHARLES SHERMAN, OF ANACORTES, WASHINGTON.

BEVERAGE-MIXER.

1,345,263.

Specification of Letters Patent.   Patented June 29, 1920.

Application filed October 14, 1919. Serial No. 330,622.

*To all whom it may concern:*

Be it known that I, SAMUEL C. SHERMAN, a citizen of the United States, residing at Anacortes, in the county of Skagit and State of Washington, have invented new and useful Improvements in Beverage-Mixers, of which the following is a specification.

The object of the invention is to provide an apparatus adapted for the preparation of a substitute for the cracked or shaved ice ordinarily employed in making mixed drinks such as are served at soda water fountains and the like, and having advantages in the matter of the resulting beverage over those which can be secured in the ordinary way, the apparatus being such as can be constructed at a small cost and maintained at liberal expense to the dispenser, and with these objects in view the same consists in a construction and combination of parts of which the preferred embodiment is shown in the accompanying drawings, it being understood that changes in form and proportion may be resorted to within the scope of the claim without departing from the principles involved.

In the drawings:—

Figure 1 is a sectional view of the apparatus.

Fig. 2 is a plan view with the top or cover omitted.

Essentially the apparatus consists of a can or receptacle 10, which may be of sheet metal or the like, which is housed within concentrically arranged inner and outer tanks or tubs 11 and 12 provided with a common removable cap or cover 13.

The can or receptacle is adapted to be charged with sweet milk and in the inner tub or tank completely surrounding and embedding said can or receptacle there should be placed cracked ice and salt so as to produce a freezing mixture to the end that the contents of the can or receptacle if served at infrequent intervals will congeal and form a creamy substance adapted to be placed in milk shakes or mixed drinks of various kinds in connection with which cracked or shaved ice is now employed, to the end that a richer and more palatable mixture is provided while the necessary lowness of temperature is imparted to the drink by reason of the lowness of the temperature of the contents of the can or receptacle.

The bottom of the inner tub or tank is perforated as shown at 14 to permit the water from the melting ice to pass into the outer tub or tank which in turn is provided with an overflow drain 15 and a valved outlet or faucet 16. The brine passing into the outer receptacle surrounding the inner tub or tank serves to maintain the latter and its contents at a low temperature, and hence prevent the excessively rapid melting of the ice forming the contents of the inner tank so that the contents of the inner can or receptacle may be properly and efficiently chilled. The mixing or agitation of the contents of said can or receptacle may be effected by any suitable manner, by any suitable implement such as a spoon or paddle, access being had to the interior thereof upon the removal of the cap or cover as will be understood.

It will also be understood that the apparatus may be made in any suitable ornamental form which may present a satisfactory appearance on the counter or buffet of a soda water fountain where it will be in convenient reach of the dispenser to permit of introducing the required quantity of the frozen or congealed milk into the glasses for the beverages as they are prepared for presentation to the customer.

As shown in the drawing the annular cover member 17 is provided with inwardly extending supports 18 which engage the can or receptacle 10, preferably above a bead 19 thereof, to center the can and guard against the possibility of the floating thereof, particularly if not entirely filled, by reason of the buoyancy of the liquid contents of the outer tank.

Having thus described my invention what I claim as new is:—

An apparatus for the purpose indicated having an inner can or receptacle for milk or the like and a housing inclosing said can or receptacle and consisting of concentrically disposed inner and outer tanks provided with a common cap or cover and adapted respectively to contain a freezing mixture and the drainage therefrom, the cap or cover having an exterior or peripheral fixed member covering the outer tank and provided with a central opening giving access to the inner tank, an annular section fitted in the opening of the permanent section to close the top of the inner tank and having a depending restraining support for said can or receptacle and also provided with a central opening of a diameter exceeding that of said can or receptacle, and an inner or central removable lid closing the opening in the annular section and removable independently thereof to give access to the contents of the can or receptacle.

In testimony whereof I affix my signature.

SAMUEL CHARLES SHERMAN.